United States Patent [19]

Herchenbach et al.

[11] 4,329,180

[45] May 11, 1982

[54] METHOD AND APPARATUS FOR CALCINING FINE-GRAINED MATERIAL AND FOR GENERATING COAL DUST

[75] Inventors: Horst Herchenbach, Hennef; Jakob Ansen, Cologne, both of Fed. Rep. of Germany

[73] Assignee: Klöckner-Humboldt-Deutz AG, Fed. Rep. of Germany

[21] Appl. No.: 238,939

[22] Filed: Feb. 27, 1981

[30] Foreign Application Priority Data

Mar. 21, 1980 [DE] Fed. Rep. of Germany ....... 3010909

[51] Int. Cl.$^3$ .............................................. C04B 7/02

[52] U.S. Cl. ...................................... 106/100; 432/13; 432/16; 432/106

[58] Field of Search .................... 106/100; 432/13, 16, 432/106

[56] References Cited

U.S. PATENT DOCUMENTS 2,600,515 6/1952 Mooser .............................. 106/100
4,260,370 4/1981 Goldmann et al. ................ 106/100

FOREIGN PATENT DOCUMENTS 2745424 6/1979 Fed. Rep. of Germany ...... 106/100

*Primary Examiner*—James Poer
*Attorney, Agent, or Firm*—Hill, Van Santen, Steadman, Chiara & Simpson

[57] ABSTRACT

Method and apparatus for calcining fine-grained material such as in the manufacture of cement in which the raw material is subjected to the sequential steps of preheating, calcining and sintering. At least one of the stages is fueled by coal dust which has been ground and dried with a drying exhaust gas derived from one of the stages. In accordance with the invention, an exhaust gas fraction is withdrawn from one of the stages, and has a relatively high concentration of injurious substances such as alkalis and sulfur. This withdrawn exhaust gas fraction is then cooled by one of a variety of methods, and then treated for the removal of the injurious substances. Finally, the cooled gas fraction is used to dry the coal dust fuel by conserving energy which would otherwise be lost in the process.

9 Claims, 1 Drawing Figure

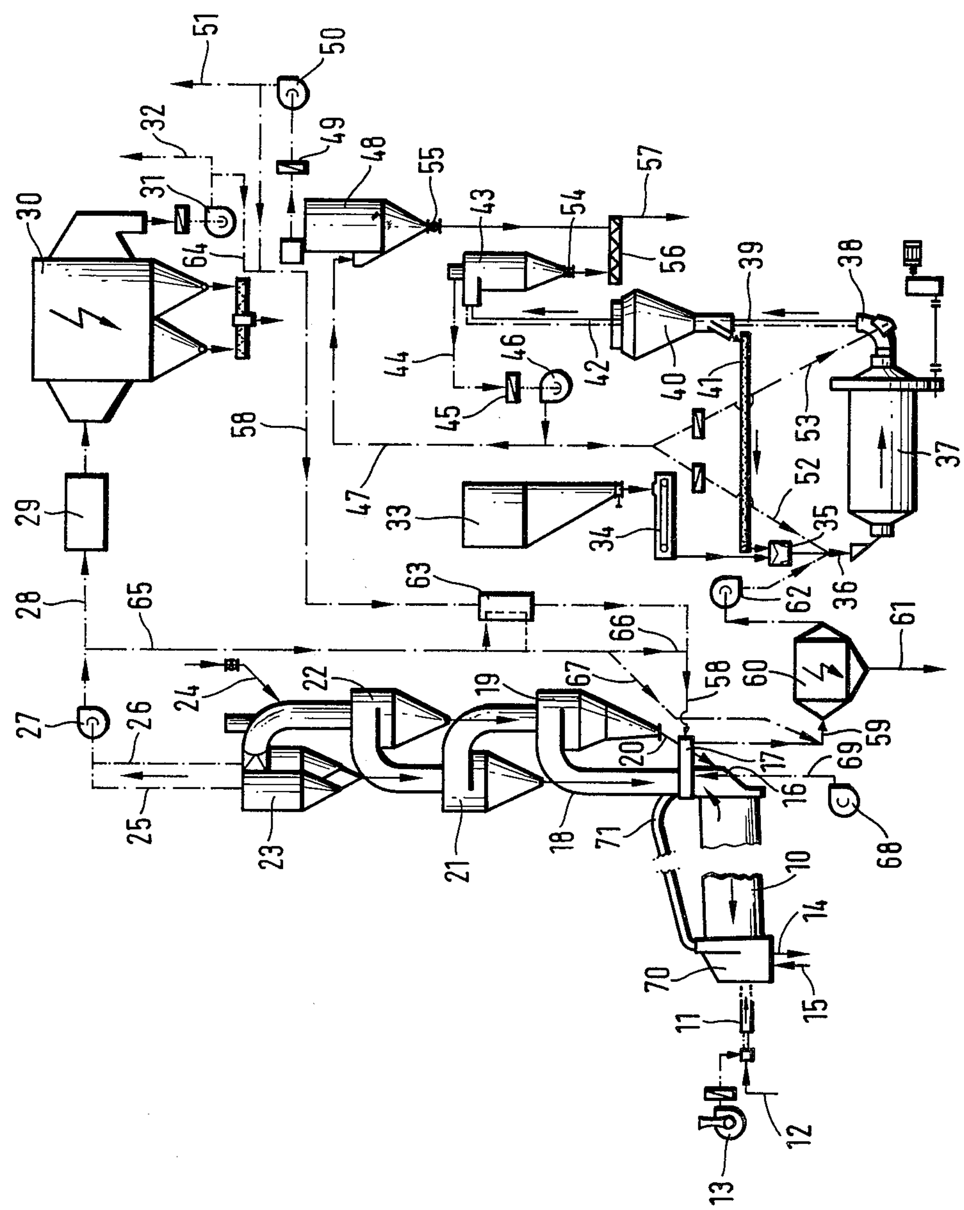

METHOD AND APPARATUS FOR CALCINING FINE-GRAINED MATERIAL AND FOR GENERATING COAL DUST

BACKGROUND OF THE INVENTION

1. Field of the Invention

The present invention is in the field of producing cement or the like from a raw material utilizing powdered coal as the principal fuel. The specific improvements of the present invention involve treating an exhaust gas fraction which normally contains a relatively high concentration of injurious substances to cool the same, removing the injurious substances from the cooled gas fraction, and then passing the resulting gas back into the drying stage for the powdered coal to recover much of its heat content.

2. Description of the Prior Art

A system is shown in German OS No. 2,745,424 in which a coal grinding and drying system is installed in the area of a raw meal pre-heating system comprising part of a burning system for the manufacture of cement clinker. The coal grinding and drying system generates a coal dust which is used as a fuel in the burning system. The coal grinding and drying system is fed with an exhaust gas stream taken from the pre-heating stage of the burning system, the partial exhaust gas stream having an oxygen content of approximately 5% maximum making it well suited for use as a drying gas because it is sufficiently inert for risk-free operation of the coal grinding and drying system.

When the material to be treated such as raw cement meal contains alkali compounds, chlorine compounds, sulfur compounds and similar injurious substances, the exhaust gases which result must be removed by means of a bypass at a location prior to the burning system exhaust gas before the exhaust gas is employed for pre-heating the raw meal or for raw meal calcining in order to avoid the circulation of injurious substances in the pre-heating and burning system. Such bypass gas must be very quickly cooled from approximately 1100° through 1300° C. to about 400° to 600° C. by mixing it directly with cold air before its removal through pipe lines and before it is cleansed and subsequently discarded because the injurious substances would otherwise lead to caking in gas-conducting pipe lines. It is evident that the bypass gas withdrawn from the burning system becomes so greatly enriched with oxygen after being mixed with cold air generally containing 21% oxygen that it is no longer suitable for the inert operation of the coal grinding and drying system. Moreover, with today's energy prices and those which can be expected in the future, it is no longer justifiable from the standpoint of heat economy to discard rotary kiln exhaust gases from the burning system which contain such injurious substances without attempting recovery of some of their heat content.

SUMMARY OF THE INVENTION

The present invention provides a system for the manufacture of cement clinker combined with an adjacent coal grinding and drying system forming a compound system in which bypass gases withdrawn from the burning system and containing injurious substances and having a high heat content at their origin no longer need be discarded without securing some benefits therefrom.

In accordance with the method of the present invention, an exhaust gas which is particularly high in injurious substances is taken from the burning system before it is employed for raw meal pre-heating and/or raw meal calcining, the bypass gas is cooled, cleansed of its injurious substances and dust, and is then conveyed to the coal grinding-drying system. The feature of employing a cooled and cleansed bypass gas which originally had a high content of injurious substances as a drying gas in the coal grinding and drying operation is believed to provide a substantial technical achievement in this field.

In accordance with a special feature of the present invention, the bypass gas is mixed with a partial stream of exhaust gas arising from the coal grinding-drying system in order to cool the same. Since the coal grinding-drying system utilizes a drying gas which has a high degree of inertness, having an oxygen content of less than 12% and usually less than 9%, a mixture of a partial stream of this exhaust gas with a bypass gas containing approximately 2% to 4% oxygen boosts the oxygen content of the gas mixture to approximately 7% to 9% depending on the proportions. This gas mixture still has a sufficiently high degree of inertness to be used as a drying gas for the safe operation of the grinding-drying system. At the same time, due to the water vapor or the exhaust vapors which are contained in the exhaust gas of the coal grinding-drying system mixed with the bypass gas, the precipitation of the alkali compounds as well as sulfur from the bypass gas is improved.

BRIEF DESCRIPTION OF THE DRAWINGS

A further description of the present invention will be made in conjunction with the single FIGURE of the drawings which illustrates a flow diagram embodying the improvements of the present invention.

DESCRIPTION OF THE PREFERRED EMBODIMENTS

The drawing illustrates a system for the manufacture of cement clinker and an adjacent coal grinding-drying system for generating coal dust, with both systems being integrated to form a compound system. The burning system includes a rotary tubular kiln 10 having a burner 11 which is supplied with coal dust from a conduit 12 as well as with primary air from a blower 13. Cement clinker is discharged from the kiln 10 through a line 14 into a clinker cooler (not illustrated) which discharges air used as a hot secondary air source, and introduced by means of a line 15 into the rotary tubular kiln 10. The kiln has an intake head 16 which is situated at one end, with a collecting means in the form of a mixing gas chamber 17 being disposed above the kiln intake head 16. A rotary kiln exhaust gas line 18 is connected at the top of the gas mixer 17, and tangentially discharges into a lowermost cyclone 19 of the raw meal-cyclone heat exchanger system from which the pre-heated and at least pre-calcined raw meal enters the kiln intake head 16 by means of a line 20. The cyclone stages which together with the rotary tubular kiln 10 represent the burning system are connected to the cyclone 19 in sequence upwardly, with the individual cyclones being identified at numerals 21, 22 and 23. At the exhaust gas side of the uppermost cyclone, there is provided an intake line 24 for the cement raw material. Exhaust gas lines 25 and 26 from the uppermost cyclones are connected in common to the suction face of an exhaust gas ventilator 27. The exhaust gas from the burning system has a temperature of approximately 350° C. with an oxygen content of approximately 5%. It arrives by means of a line 28 at a gas cooler 29 which may take the form of a spray tower where it is cooled approximately to 150° C. The gas is then subsequently treated for dust removal in an electrostatic dust separator 30 which is followed by an induced draft blower 31 which discharges the filtered burning system exhaust gas with a temperature of approximately 150° C. by means of a line 32.

The coal grinding-drying system includes a raw coal hopper 33 with a metering discharge element 34 which transfers raw coal into an intake 36 of a rotating tube mill 37 through a double pendulum type regulating valve 35. A vertical stack 39 discharges into an air suspension sifter disposed at the discharge side 38 of the tube mill 37.

A sifter 40 separates finished product from residue. The residue is returned to the regulating valve 35 by means of a conveying means 41. The finished product of coal dust is introduced by means of an air stream into a clean gas line 42 which directs it into a separator 43 wherein the coal gas is separated from the mill exhaust gas. The mill exhaust gas charged with a residue of coal dust is supplied through a conduit 44 containing a control element 45 to the inlet side of a ventilator 46. A line 47 delivers the gas suspension to a filter 48 which is followed by a control element 49 and an induced draft blower 50 which discharges the filtered mill exhaust gas by means of a line 51. Depending on the requirements of the grinding process, the exhaust gas from the blower 46 can be conducted by means of a line 52 to the intake 36 of the tube mill and/or by means of a line 53 to the discharge 38 of the tube mill 37 and has a temperature of approximately 80° C. The coal dust is withdrawn by means of gas-tight regulating valves 54 and 55 from the separators 43 and 48, the coal dust being conveyed by means of a conveying device 56 and a line 57 to a coal dust hopper (not illustrated) from which the coal dust is finally transported to the burner 11 of the rotary tubular kiln 10 as well as to any further coal dust burning locations in the burning system which may be present.

The cement raw meal material may contain alkali compounds, chlorine compounds, sulfur and similar injurious substances which lead to undesirable circulations of injurious substances in the burning system. The rotary kiln exhaust gas from the kiln 10 which is high in such injurious substances is partially or entirely removed from the burning system at the mixer 17, the rotary kiln exhaust gas exhibiting a temperature of about 1100° to 1300° C. and an oxygen content of approximately 2% to 4%. The rest of the rotary kiln exhaust gas consists essentially of carbon dioxide and steam. The withdrawal location for the rotary kiln exhaust gas is formed as a bypass gas mixing chamber 17 into which filtered mill exhaust gas with a temperature of approximately 50° to 100° C. and an oxygen content of less than about 12% is introduced into the mixer 17 by means of an exhaust gas conduit 58 branched off from the line 51. By means of such admixture, the bypass gas which is high in injurious substances is very quickly cooled down to approximately 430° C. or, more broadly speaking, from 400° to 500° C. As a result of the mixing, the oxygen content of the cooled bypass gas withdrawn by means of a line 59 rises to a value of approximately 7% to 9% and is frequently less than 7%. The cooled bypass gases are then conducted by means of the line 59 to a separator such as an electrostatic dust precipitator 60 from which the injurious substances are discharged by means of a line 61. The cleansed bypass gases at a temperature of 400° to 500° C. are then conveyed by means of an induced draft blower 62 to the mill input 36 where they are mixed with returned air 52 with a temperature of approximately 50° to 100° C., typically 80° C., so that the gas mixture enters the coal grinding-drying system 37 with a temperature usually less than 380° C. This gas is well suited for use as a drying gas with a sufficient degree of inertness to be used for the coal grinding-drying stage.

The bypass gas taken from the burning system can also be quickly cooled by means of sudden, indirect heat transfer instead of by means of a direct heat transfer. A partial stream of the gas in the line 58 from the coal grinding-drying system which contains water vapor or exhaust vapors can be cooled, for example, from approximately 80° C. to approximately 50° to 60° C. by being passed through a gas cooler 63 with indirect or direct heat exchange with a water bath. Since the temperature is below the dew point, the gas mixed with the bypass gas is dehumidified. This is an advantage when the coal to be dried and ground in the grinding-drying system is very damp. For cooling the hot bypass gas, the gas can also be mixed with a partial stream of exhaust gas from the pre-heating stage of the cement burning system, the additional exhaust gas partial stream being supplied to the mixing chamber 17 by means of lines 64 and 58. The burning system exhaust gas can also be supplied to the mixing chamber 17 by means of lines 65, 66 and 58 if necessary by means of the gas cooler 63. There is also the possibility of having exhaust gas from the burning system discharge directly into the line 59 by means of lines 65 and 67, the line 59 leading from the bypass gas mixing chamber 17 to the electrostatic dust separator 60. Such variations for supplying the coal grinding-drying system with drying gas are required when the bypass mixer 17 is closed, that is, when no rotary kiln exhaust gas containing injurious substances is taken from the burning system. The filtration of the rotary kiln exhaust gas in the filter 60 offers the advantage of not having a negative influence on the calorific value and the burning behavior of the coal dust.

Fresh outside air can also be supplied to the bypass mixer 17 by means of a blower 68 and the line 69. The fresh air, however, due to its oxygen content of approximately 21%, diminishes the inertness of the drying gas employed for the coal grinding-drying but at the same time makes the drying gas less humid than the recirculated mill exhaust gas containing exhaust vapors. As more rotary kiln exhaust gas is withdrawn from the burning system at the mixer 17, the raw meal heat exchanger cyclone system must be supplied with more tertiary air which is advantageously introduced into the exhaust gas line 18 above the mixing chamber 17 by means of a tertiary air conduit 71 connected to a kiln discharge head 70 of the kiln 10. The exhaust gas line 18 can likewise be equipped with a burner location supplied with coal dust for the calcination of the raw meal.

It should be evident that various modifications can be made to the described embodiments without departing from the scope of the present invention.

We claim as our invention:

1. In a cement making method in which the cement raw material is subjected to the sequential stages of pre-heating, calcining and sintering, at least one of said stages being fueled by coal dust which has been ground and dried with a drying exhaust gas derived from one of said stages, the improvement which comprises:

withdrawing an exhaust gas fraction having a relatively high concentration of injurious substances such as alkalis and sulfur from one of said stages, cooling the withdrawn exhaust gas fraction, substantially removing the injurious substances from the cooled gas fraction, and utilizing the resulting gas fraction to dry the aforementioned coal dust.

2. A method according to claim 1 which includes the step of:

mixing the exhaust gas fraction with a second exhaust gas fraction derived from the coal dust drying to cool the same.

3. A method according to claim 2 in which:

said exhaust gas fraction at a temperature of about 1100° to 1300° C. and an oxygen content of about 2% to 4% is mixed with said second exhaust gas fraction having a temperature of about 50° to 100° C. and an oxygen content of less than about 12% to produce a relatively inert drying gas at a temperature of about 400° to 500° C. and an oxygen content of about 7 to 9%.

4. A method according to claim 1 which includes the step of:

removing said injurious substances by electrostatic precipitation.

5. A method according to claim 2 which includes the step of:

cooling said second exhaust gas fraction by indirect or direct heat exchange with a water bath.

6. A method according to claim 1 which includes the step of:

cooling the withdrawn exhaust gas fraction by mixing the same with a stream of exhaust gas from said pre-heating stage.

7. An apparatus for making cement comprising:

a pre-heating stage, a calcining stage, and a rotary kiln, in sequence, means for introducing raw cement meal into said pre-heating stage, exhaust means for withdrawing exhaust gases from said rotary kiln, collecting means for collecting exhaust gases withdrawn from said kiln, grinding and drying means for a powdered coal fuel, means for withdrawing an exhaust gas from said drying means, means for passing the withdrawn exhaust gas into said collecting means, and means for passing the mixture of gases in said collecting means into said grinding and drying means.

8. An apparatus according to claim 7 in which:

said collecting means is located above the inlet to said rotary kiln.

9. An apparatus according to claim 8 in which:

said grinding and drying means includes a tube mill, a separator means for removing injurious substances from a gas stream, means connecting the output of said collecting means to said separator means, and means for passing the output of said separator means into said tube mill.

* * * * *